United States Patent
Kawazoe

(10) Patent No.: US 6,295,493 B1
(45) Date of Patent: Sep. 25, 2001

(54) VEHICLE ROLL RIGIDITY CONTROL DEVICE

(75) Inventor: Hiroshi Kawazoe, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/150,618

(22) Filed: Sep. 10, 1998

(30) Foreign Application Priority Data

Sep. 10, 1997 (JP) .................................................. 9-245459

(51) Int. Cl.$^7$ .............................. B60G 23/00; G06F 7/00
(52) U.S. Cl. ................................ 701/38; 701/36; 701/37; 280/5.502; 280/5.506; 280/5.507; 280/5.51; 280/5.515
(58) Field of Search .................................. 701/36, 37, 38, 701/45, 1, 41, 48; 180/282, 415, 408, 422, 420, 446, 448; 280/735, 5.515, 5.514, 5.507, 5.504, 5.51, 5.518, 6.158, 5.52, 5.513, 124.106, 5.512, 5.511, 5.506, 5.502, 5.5, 5.508; 188/266.4, 282.7, 282.4

(56) References Cited

U.S. PATENT DOCUMENTS

| | | | |
|---|---|---|---|
| 4,652,010 | * | 3/1987 | Sugasawa ........................... 280/5.511 |
| 4,679,808 | * | 7/1987 | Ito et al. .............................. 180/408 |
| 4,771,851 | * | 9/1988 | Nystuen et al. .................... 180/419 |
| 4,802,545 | * | 2/1989 | Nystuen et al. .................... 180/419 |
| 4,821,188 | * | 4/1989 | Ikemoto et al. ....................... 701/38 |
| 4,844,506 | * | 7/1989 | Moriguchi et al. ................. 280/5.51 |
| 4,947,326 | * | 8/1990 | Mori et al. ............................ 701/42 |
| 4,954,957 | * | 9/1990 | Kawagoe et al. ..................... 701/48 |
| 5,149,131 | * | 9/1992 | Sugasawa et al. ............... 280/5.512 |
| 5,172,929 | * | 12/1992 | Butsuen et al. ................... 188/266.4 |
| 5,265,019 | * | 11/1993 | Harara et al. ......................... 701/41 |
| 5,321,616 | * | 6/1994 | Okuda et al. ......................... 701/37 |
| 5,351,985 | * | 10/1994 | Ando et al. .......................... 280/5.52 |
| 5,519,611 | * | 5/1996 | Tagawa et al. ....................... 701/37 |
| 5,522,482 | * | 6/1996 | Kashiwagi et al. .............. 188/266.4 |
| 5,559,701 | * | 9/1996 | Shimizu et al. ...................... 701/36 |
| 5,642,899 | * | 7/1997 | Inoue et al. ...................... 280/5.515 |
| 5,911,768 | * | 6/1999 | Sasaki .................................. 701/38 |

FOREIGN PATENT DOCUMENTS 7-215035    8/1995    (JP) .

* cited by examiner

Primary Examiner—Jacques H. Louis-Jacques
(74) Attorney, Agent, or Firm—Foley & Lardner

(57) ABSTRACT

A vehicle roll rigidity control device comprises a control unit and an actuator which can adjust an attenuation force installed between the vehicle front wheel and body. The control unit reduces the attenuation force of the actuator and increases the ability of the vehicle to turn around when the vehicle is in a turn transient state. When the sequential steering operation to the left and right is performed, the controller increases the attenuation force of the actuator and increase the roll rigidity of the front wheels.

4 Claims, 6 Drawing Sheets

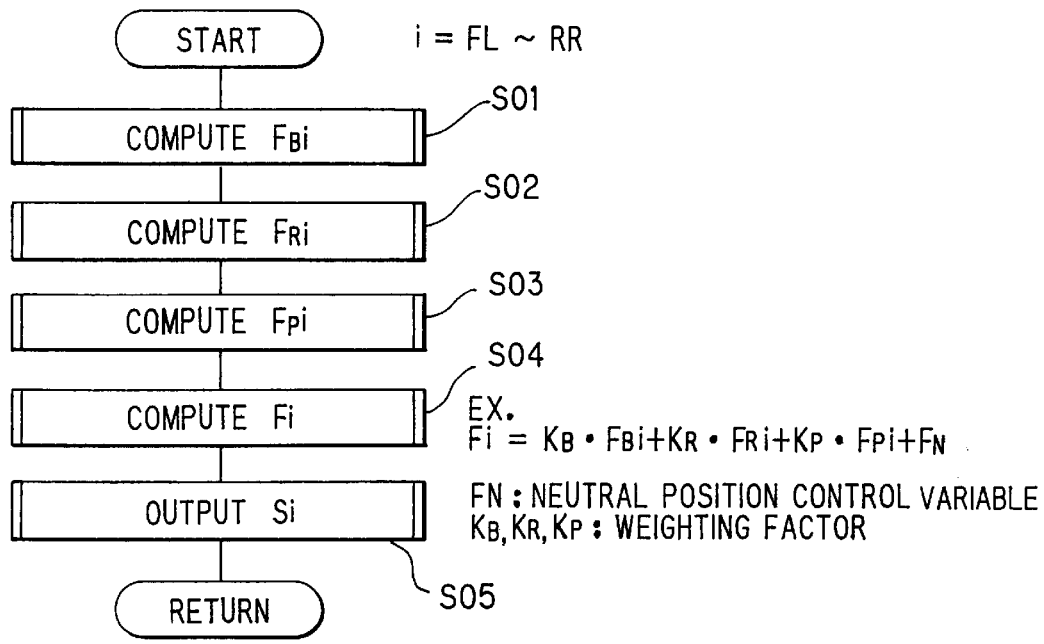
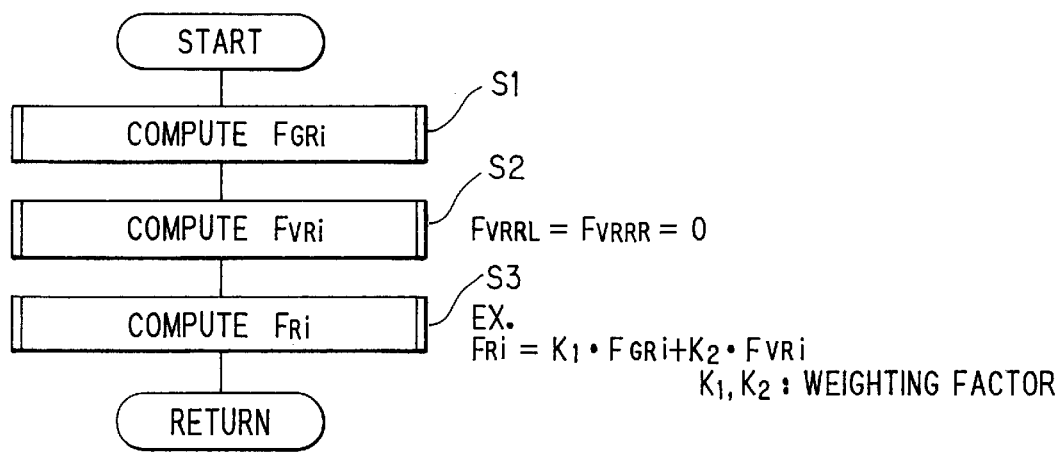

VEHICLE ROLL RIGIDITY CONTROL DEVICE

FIELD OF THE INVENTION

The present invention relates to roll rigidity control of a vehicle.

BACKGROUND OF THE INVENTION

A suspension device is known in the art which varies the roll rigidity of a vehicle according to the turning state in order to improve the turning behavior of the vehicle.

Tokkai Hei 7-215035 published in 1995 by the Japanese Patent Office discloses a method to decrease the roll rigidity of the front wheels and improve the grip force of the front wheels relatively in a turn transient state, and to increase the roll rigidity of the front wheels and improve the grip force of the rear wheels relatively in a turning steady state. The turn transient state is a state wherein a steering angle is changing, and the turning steady state is a state wherein the steering angle is held almost constant when turning.

In this device, the damping force of hydraulic cylinders between the front wheels and the vehicle body is increased and decreased to adjust the roll rigidity. When the damping force of the hydraulic cylinders decreases, the roll rigidity of the front wheels decreases, and conversely when the damping force increases, the roll rigidity of the front wheels increases.

However, in the aforesaid method, when a sequential steering operation (to the left followed by a steering operation to the right or vice versa) is performed on series curves and the turn transient state continues, the damping force of the hydraulic cylinders maintains the decreased state and does not recover.

Therefore, due to a roll moment which repeatedly acts on the vehicle body, the front of the body tends to roll to the left and right.

SUMMARY OF THE INVENTION

It is therefore an object of this invention to suppress the rolling of the front of a vehicle body when the left and right steering operations are sequentially performed.

In order to achieve the above object, this invention provides a roll rigidity control device comprising an actuator installed between a vehicle front wheel and body for generating an attenuation force according to a command signal, a sensor for detecting a sequential steering operation to the left and right, and a microprocessor. The microprocessor is programmed to output the command signal to the actuator so that, when the vehicle is in a turn transient state, the attenuation force of the actuator is smaller than the attenuation force when the vehicle is moving straight, and output the command signal to the actuator such that the attenuation force of the actuator is larger than the attenuation force when the vehicle is in the turn transient state, when the sequential steering operation is detected.

According to an aspect of this invention, the microprocessor is further programmed to output command signal to the actuator such that the attenuation force of the actuator is larger than the attenuation force when the vehicle is moving straight, when the sequential steering operation is detected.

According to another aspect of this invention, the microprocessor is further programmed to output the command signal to the actuator such that the attenuation force of the actuator is larger than the attenuation force when the vehicle is moving straight, when the vehicle is in a turning steady state, and output the command signal to the actuator such that the attenuation force of the actuator is still larger than the attenuation force when the vehicle is in the turning steady state, when the sequential steering operation is detected.

According to yet another aspect of this invention, the actuator is a hydraulic cylinder, and the microprocessor is programmed to vary the attenuation force of the hydraulic cylinder by varying the damping coefficient of the hydraulic cylinder.

The details as well as other features and advantages of this invention are set forth in the remainder of the specification and are shown in the accompanying drawings.

BRIEF DESCRIPTION OF THE DRAWINGS

FIG. 3 is a flowchart describing a roll rigidity control process performed by the control unit.

FIG. 4 is a flowchart describing a process for computing a roll control variable performed by the control unit.

DESCRIPTION OF THE PREFERRED EMBODIMENTS

Figure 1:
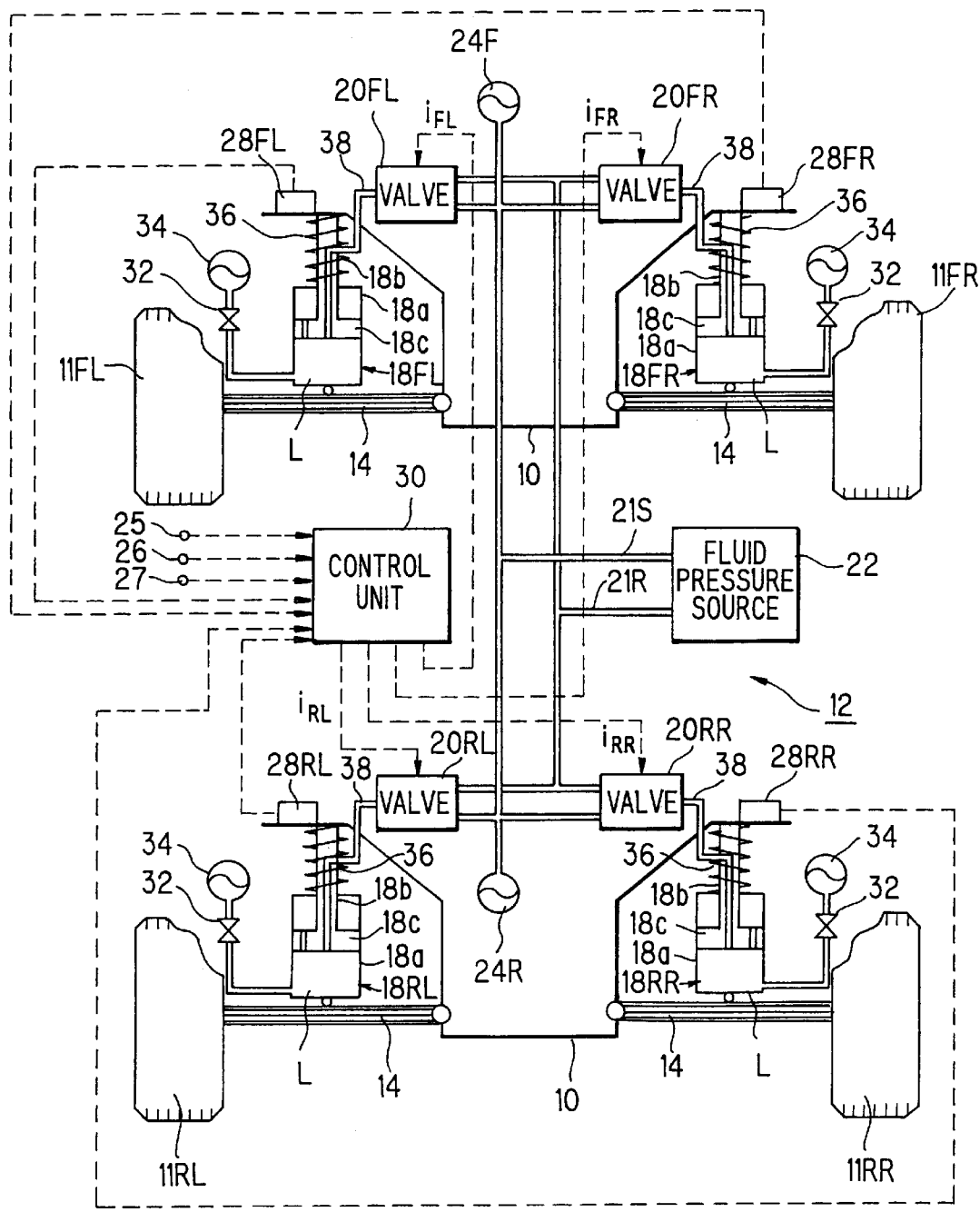
FIG. 1 is a schematic diagram of a roll rigidity control device according to this invention.

Referring to FIG. 1 of the drawings, a roll rigidity control device comprises an active suspension 12 and a control unit 30. The active suspension 12 comprises hydraulic cylinders 18FL~18RR, pressure control valves 20FL~20RR, a fluid pressure source 22, and pressure storage accumulators 24F, 24R.

The hydraulic cylinders 18FL~18RR are each installed as actuators between a vehicle body 10 and suspension arms 14 of wheels 11FL~11R. The pressure control valves 20FL~20RR each adjust a hydraulic fluid pressure in the hydraulic cylinders 18FL~18RR. The fluid pressure source 22 supplies hydraulic fluid at a predetermined pressure to the pressure control valves 20FL~20RR via a supply pipe 21S, and return fluid from the pressure control valves 20FL~20RR is collected via a return pipe 21R. The accumulators 24F, 24R are installed in the supply pipe 21S by which the fluid pressure source 22 and pressure control valves 20FL~20RR are connected.

In addition, the roll rigidity control device comprises vertical acceleration sensors 28FL~28RR, a vehicle speed sensor 27, a steering angle sensor 26, and a steering angular velocity sensor 25.

The vertical acceleration sensors 28FL~28RR are installed on each wheel 11FL~11RR of the body 10, and detect a vertical acceleration of the vehicle body 10 at corresponding positions. The vehicle speed sensor 27 detects a vehicle speed VSP. The steering angle sensor 26 detects a steering angle θ of the steering wheel, not shown. The steering angular velocity sensor 25 detects a steering angular velocity θ' of the steering wheel.

Based on the vertical accelerations $G_{FL}$~$G_{RR}$ from the vertical acceleration sensors 28FL~28RR, the vehicle speed VSP from the vehicle speed sensor 27, the steering angle θ from the steering angle sensor 26 and the steering angular velocity θ' from the steering angular velocity sensor 25, the control unit 30 controls the output pressures of the pressure control valves 20FL~20RR.

The hydraulic cylinders 18FL 18RR each comprise a cylinder tube 18a. A piston 18c which has a through-hole in an axial direction is housed in the cylinder tube 18a. A pressure chamber L is formed under the piston 18c. The hydraulic cylinders 18FL~18RR generate a thrust according to a difference in the pressure receiving areas of the upper and lower surfaces and the internal pressure of the piston 18c.

The base end of the cylinder tube 18a is connected to the suspension arm 14, and the top of a piston rod 18b is connected to the vehicle body 10.

The pressure chambers L are each connected to output ports of the pressure control valves 20FL~20RR via a pipe 38. The pressure chambers L are each connected to accumulators 34 via valves 32 for absorbing the vibration of the unsprung. Coil springs 36 having a relatively small spring constant which support the static load of the vehicle body 10, are provided for the hydraulic cylinders 18FL~18RR.

The pressure control valves 20FL~20RR are conventional three port linear electromagnetic pressure reduction valves, and comprise a cylindrical housing for housing a spool and a linear solenoid fixed to the housing. The spool varies its position according to the current i supplied to the linear solenoid.

As a result, the supply pipe 21S and return pipe 21R are selectively connected to the hydraulic cylinders 18FL~18RR, and the support rigidity of the wheels 11FL~11RR due to the hydraulic cylinders 18FL~18RR is varied.

Regarding the currents $i_{FL}$~$i_{RR}$ supplied to the linear solenoids and the control pressure P output from the output ports of the pressure control valves 20FL~20RR, the pressure P is a minimum control pressure $P_{MIN}$ when the current i is a minimum current $i_{MIN}$ taking account of noise, and the control pressure P increases in linear proportion to the current i when the current i is increased from the minimum current $i_{MIN}$. The control pressure P is a maximum control pressure $P_{MAX}$ corresponding to the set line pressure of the fluid pressure source 22 when the current is a maximum current $i_{MAX}$.

The control pressure for maintaining the body in a neutral state is a neutral control pressure $P_{CN}$, and the current to achieve it is a neutral current $i_N$.

The vertical acceleration sensors 28FL~28RR output a preset neutral voltage when the vertical accelerations $G_{FL}$~$G_{RR}$ are 0, output a voltage obtained by adding a voltage according to the acceleration to the neutral voltage when an acceleration $G_{FL}$~$G_{RR}$ in an upwards direction is detected, and output a voltage obtained by subtracting a voltage according to the acceleration from the neutral voltage when an acceleration $G_{FL}$~$G_{RR}$ in a downwards direction is detected.

The vehicle speed sensor 27 outputs a voltage according to the magnitude of the forward/backward vehicle speed as a vehicle speed VSP. The vehicle speed VSP is a positive or negative value according to whether the vehicle is moving forwards or backwards.

The steering angle sensor 26 outputs a voltage according to the magnitude of a steering angle from a neutral position of the steering wheel as a steering angle θ. The steering angle θ is a positive or negative value according to whether the steering wheel is in a position rotated to the left or the right from the neutral position.

The steering angular velocity sensor 25 outputs a voltage according to the magnitude of the steering angular velocity of the steering wheel as a steering angular velocity θ'. The steering angular velocity θ' is a positive or negative value according to the direction in which the steering wheel is turned.

Figure 2:
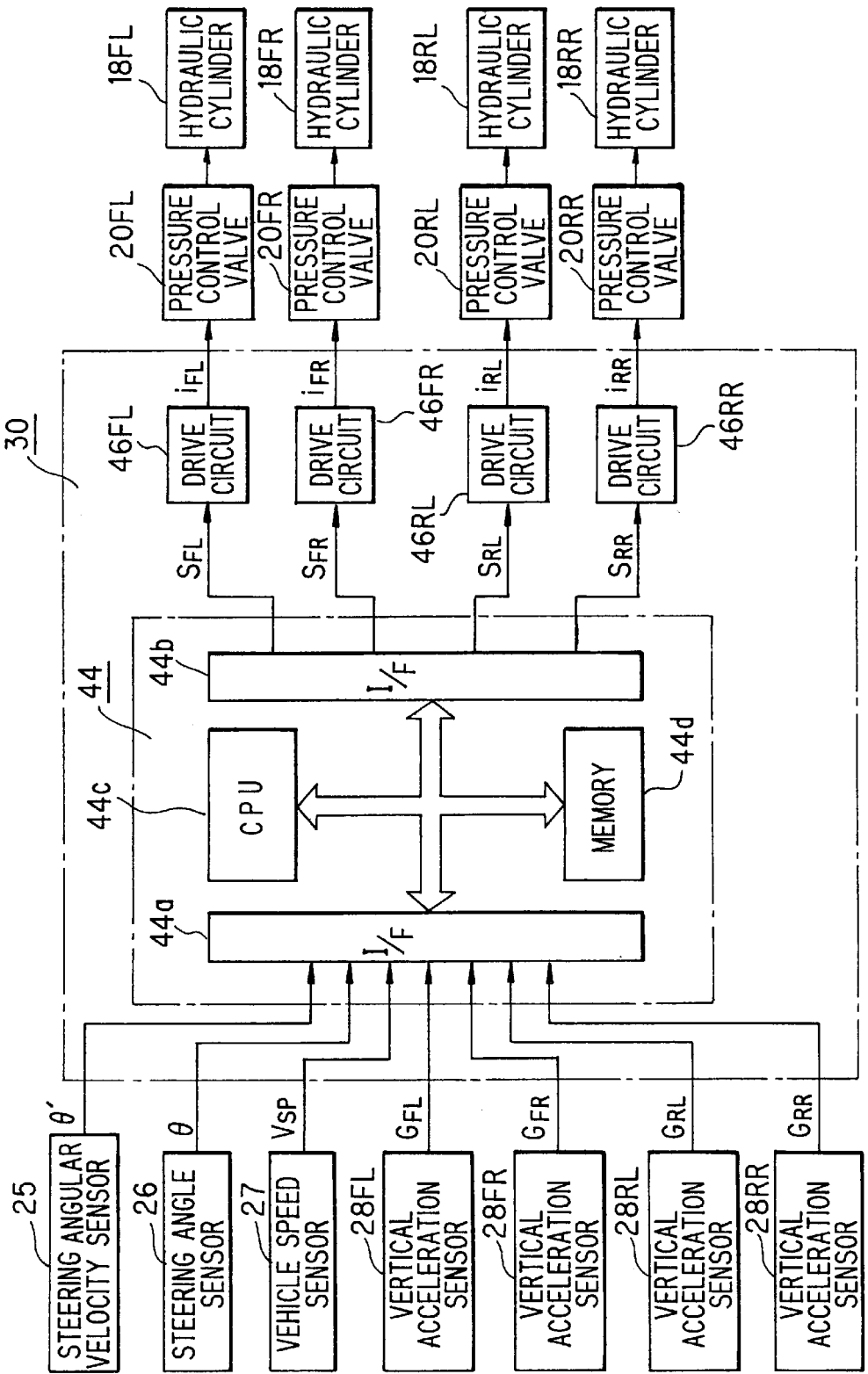
FIG. 2 is a block diagram of a control unit according to this invention.

The control unit 30 comprises a microcomputer 44 and drive circuits 46FL~46RR as shown in FIG. 2.

The microcomputer 44 comprises an input interface circuit 44a which has an A/D conversion function, an output interface circuit 44b which has a D/A conversion function, a CPU (Central Processing Unit) 44c, and a memory 44d which comprises a RAM and ROM.

The input interface circuit 44a A/D converts the detection values $G_{FL}$~$G_{RR}$ input from the vertical acceleration sensors 28FL~28RR. The output interface circuit 44b outputs pressure command values $S_{FL}$~$S_{RR}$ respectively to the drive circuits 46FL~46RR. The drive circuits 46FL~46RR convert the pressure command values $S_{FL}$~$S_{RR}$ to drive currents $i_{FL}$~$i_{RR}$, and output them to the pressure control valves 20FL~20RR.

The roll rigidity control process performed by the microcomputer 44 of the control unit 30 will now be described referring to the flowchart of FIG. 3.

This flowchart is executed at a predetermined sampling time ΔT (e.g. 10 milliseconds). This flowchart has no steps for communication, however programs or maps stored in the ROM and data stored in the RAM of the memory 44d are continually transmitted to the buffer of the CPU 44c. The results of computations by the CPU 44c are also stored as necessary in the memory 44d.

The steering angular velocity θ' from the steering angular velocity sensor 25, steering angle θ from the steering angle sensor 26, wheel speed VSP from the wheel speed sensor 27 and vertical accelerations $G_{FL}$~$G_{RR}$ from the vertical acceleration sensors 26FL~26RR, are read as required.

First, in a step S01, a bounce control variable $F_{Bi}$ (i=FL~RR) to control the bounce of the vehicle body 10, which is one of the fluid pressure control variables of the hydraulic cylinders 18FL~18RR, is computed.

An acceleration component which bounces the vehicle body 10 is computed from the vertical accelerations $G_{FL}$~$G_{RR}$ from the vertical acceleration sensors 28FL~28RR, integrated if necessary to compute a velocity component, and integrated again to give a displacement component. Bounce suppression gains which increase with an increase in the vehicle speed VSP are set respectively for the acceleration component, velocity component and displacement component.

After multiplying the acceleration component, velocity component and displacement component respectively by the bounce suppression gains, the bounce control variable $F_{Bi}$ is computed from the weighted average of these products. Increasing the bounce suppression gain together with increase of vehicle speed VSP gives both stability at high speed and comfort at low speed.

Figure 5:
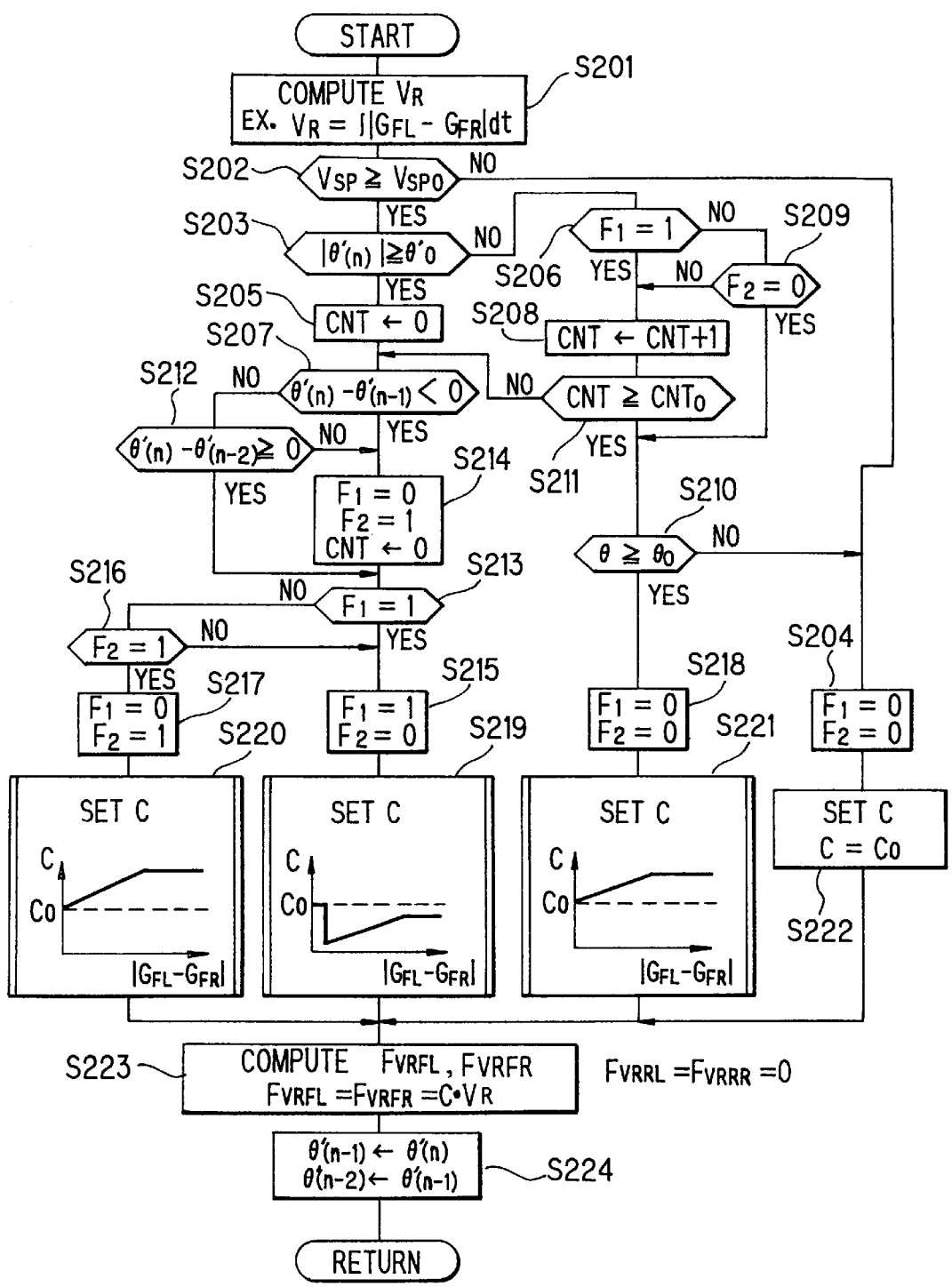
FIG. 5 is a flowchart describing a process for computing a roll attenuation control variable performed by the control unit.

In a step S02, according to computing processes of FIG. 4 and FIG. 5 described hereafter, a roll control variable $F_{Ri}$ (i=FL~RR) which controls the roll of the vehicle body 10, which is one of the fluid pressure control variables of the hydraulic cylinders 18FL~18RR, is computed.

In a step S03, a pitch control variable $F_{Pi}$ (i=FL~RR) which controls the pitch of the vehicle body 10, which is one of the fluid pressure control variables of the hydraulic cylinders 18FL~18RR, is computed.

First, a pitch moment or pitch angular acceleration which acts on the vehicle body 10 is computed from the vertical accelerations $G_{FL}$~$G_{RR}$ of the vertical acceleration sensors 28FL~28RR. If necessary this is integrated to compute a speed or angular velocity, and integrated again to compute a displacement or angle. A pitch suppression gains which increase with increase of the vehicle speed VSP are set for each component and multiplied by each component. A pitch control amount $F_{Pi}$ is calculated from the weighted average of these products. Increasing the pitch suppression gain together with increase of vehicle speed VSP gives both stability at high speed and comfort at low speed.

In a step S04, a total control variable $F_i$ of the hydraulic cylinders 18FL~18RR is computed from the bounce control variable $F_{Bi}$, roll control variable $F_{Ri}$ and pitch control variable $F_{Pi}$ computed in the steps S01, S02 and S03.

Specifically, weighting factors $K_B$, $K_R$ and $K_P$ corresponding to each control variables are set, these weighting factors are multiplied by their corresponding variables, and a neutral position control variable $F_N$ for achieving the aforesaid neutral position is added to the weighted average of these products so as to compute a total control variable $F_i$.

When the total control variable $F_i$ exceeds an upper limiting value of the hydraulic cylinders 18FL~18RR, the weighting factors $K_B$, $K_R$, $K_P$ may be modified according to the ratio of the control variables $F_{Bi}$, $F_{Ri}$, $F_{Pi}$.

In a step S05, a control signal $S_i$ to achieve the total control variable $F_i$ is output, and the routine returns to the main program. Herein, if the cylinder bores of the hydraulic cylinders 18FL~18RR are constant, each control variable is proportional to the supply fluid pressure, and the output pressures of the pressure control valves 20FL~20RR are proportional to the supply current, so the control signal $S_i$ for achieving the total control variable $F_i$ is determined by a certain proportional constant.

The procedure for generating command currents $i_{RL}$~$i_{RR}$ from the drive circuits 46FL~46RR due to this control signal $S_i$ depends on the PWM (Pulse Width Modulation) or the amplification of the corresponding direct current component by a floating type amplifier.

Next, a process for computing the roll control variable $F_{Ri}$ (i=FL~RR) performed by the step S02 of FIG. 3 will be described referring to the flowchart of FIG. 4.

First, in a step S1, a roll suppression control variable $F_{GRi}$ is computed. Specifically, a roll moment which acts on the vehicle body 10 or a roll angular acceleration is calculated from the vertical accelerations $G_{FL}$~$G_{RR}$ from the vertical acceleration sensors 28FL~28RR. A roll suppression gain which increases with increase of the vehicle speed VSP is set. The roll suppression control variable $F_{Ri}$ is calculated from the product of the roll moment and roll suppression gain. Increasing the roll suppression gain together with increase of the vehicle speed VSP gives both stability at high speed and comfort at low speed.

In a step S2, a roll attenuation control variable $F_{VRi}$ is computed according to the computing process of FIG. 5, described hereafter.

In a step S3, the roll control variable $F_{Ri}$ is computed from the roll suppression control variable $F_{GRi}$ and roll attenuation control variable $F_{VRi}$ of the hydraulic cylinders 18FL~18RR, and the routine proceeds to the step S03 in FIG. 3.

When the roll control variable $F_{Ri}$ is computed, the weighting factors $K_1$, $K_2$ are set relative to each control variables, and the roll suppression control variable $F_{Ri}$ is computed from the weighted average of the roll suppression control variable $F_{Ri}$ and the roll attenuation control variable $F_{VRi}$.

When the roll control variable $F_{Ri}$ exceeds a preset upper limit, the weighting factors $K_1$, $K_2$ may for example be modified according to the ratio of the control variables $F_{GRi}$, $F_{VRi}$.

Next, the process for computing the roll attenuation control variable $F_{VRi}$ (i=FL~RR) performed in the step S2 of FIG. 4 will be described referring to the flowchart of FIG. 5.

First, in a step S201, a roll speed $V_R$ is computed. Specifically, an absolute value of a difference between the vertical accelerations $G_{FL}$, $G_{FR}$ from the vertical acceleration sensors 28FL, 28FR installed on the left and right front wheels is integrated so as to compute the roll speed $V_R$ of the front of the vehicle.

In a step S202, it is determined whether or not the vehicle speed VSP from the vehicle speed sensor 27 is equal to or greater than a threshold $VSP_0$ to determine whether or not the vehicle is running at low speed. When the vehicle speed VSP is equal to or greater than the threshold value $VSP_0$, the routine proceeds to a step S203, otherwise the routine proceeds to a step S204.

In the step S203, it is determined whether or not an absolute value $|\theta'(n)|$ of the present value of the steering angular velocity from the steering angular velocity sensor 25 is equal to or greater than a predetermined value $\theta'_0$. When the absolute value $|\theta'(n)|$ of the present value of the steering angular velocity is equal to or greater than the predetermined value $\theta'_0$, the routine proceeds to a step S205, otherwise the routine proceeds to a step S206.

In the step S205, a sequential steering detection counter CNT is set to "0", and the routine proceeds to a step S207.

In the step S206, it is determined whether or not a transient state flag $F_1$ is "1". When the transient state flag $F_1$ is "1" the routine proceeds to a step S208, otherwise the routine proceeds to a step S209.

In the step S209, it is determined whether or not a sequential steering flag $F_2$ is "0". When the sequential steering flag $F_2$ is "0", the routine proceeds to a step S210, otherwise the routine proceeds to the step S208.

In the step S208, the counter CNT for sequential steering detection is increased, and the routine proceeds to a step S211.

In the step S211, it is determined whether or not the counter CNT is equal to or greater than a predetermined value $CNT_0$ corresponding to a preset relatively short time. $CNT_0$ is set to, for example, 3~5. When the counter CNT is equal to or greater than the predetermined value $CNT_0$, the routine proceeds to the aforesaid step S210, otherwise the routine proceeds to the step S207.

In the step S207, it is detected whether or not the product of the value $\theta'(n)$ of the steering angular velocity on the present occasion and the value $\theta'(n-1)$ on the immediately preceding occasion is negative, that is, it is detected whether the steering direction is different on the immediately preceding occasion and the present occasion. When the steering direction on the immediately preceding occasion and the present occasion is different, the routine proceeds to a step S214, otherwise the routine proceeds to a step S212.

In the step S212, it is detected whether or not the product of the value θ'(n) of the steering angular velocity on the present occasion and the value θ'(n−2) two preceding occasions earlier is negative, that is, it is detected whether the steering direction is different two preceding occasions earlier and on the present occasion. When the steering direction on the immediately preceding occasion and two preceding occasions earlier is different, the routine proceeds to the step S214, otherwise the routine proceeds to a step S213.

In the step S214, the transient state flag $F_1$ is set to "0", the sequential steering flag $F_2$ is set to "1", and the counter CNT is set to "0", and the routine proceeds to the step S213.

In the step S213, it is determined whether or not the transient state flag $F_1$ is "1". When the transient state flag $F_1$ is "1", the routine proceeds to a step S215, otherwise the routine proceeds to a step S216.

In the step S216, it is determined whether or not the sequential steering flag $F_2$ is "1". When the sequential steering flag $F_2$ is "1", the routine proceeds to a step S217, otherwise the routine proceeds to the step S215.

In the step S215, the transient state flag $F_1$ is set to "1" and the sequential steering flag $F_2$ is set to "0", and the routine proceeds to a step S219.

In the step S217, the transient state flag $F_1$ is set to "0" and the sequential steering flag $F_2$ is set to "1", and the routine proceeds to a step S220.

In the step S210, it is determined whether or not the steering angle θ from the steering angle sensor 26 is equal to or greater than a predetermined minute threshold $θ_0$. When the steering angle θ is equal to or greater than the minute threshold $θ_0$, the routine proceeds to a step S218, otherwise the routine proceeds to the step S204.

In the step S218, the transient state flag $F_1$ and sequential steering flag $F_2$ are each set to "0", and the routine proceeds to a step S221.

In the step S204, the transient state flag $F_1$ and sequential steering flag $F_2$ are each set to "0", and the routine proceeds to a step S222.

Figure 6:
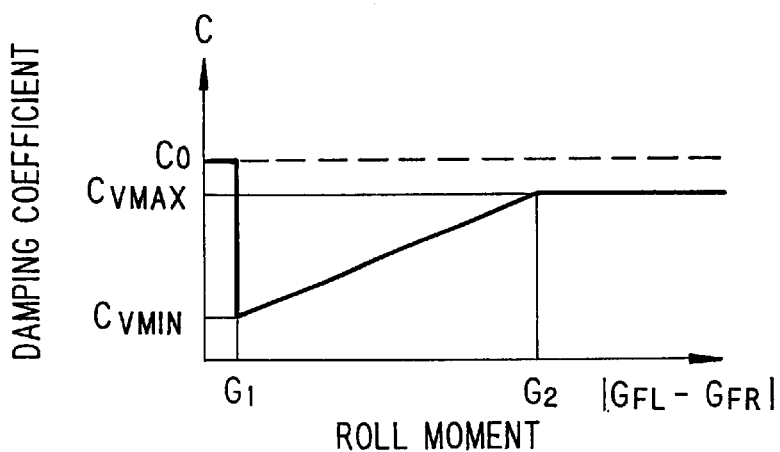
FIG. 6 is a map which specifies a relation between a roll moment and a damping coefficient in a turn transient state with which the control unit is provided.

In the step S219, a damping coefficient C is set according to a turn transient state map in FIG. 6, and the routine proceeds to a step S223.

Figure 7:
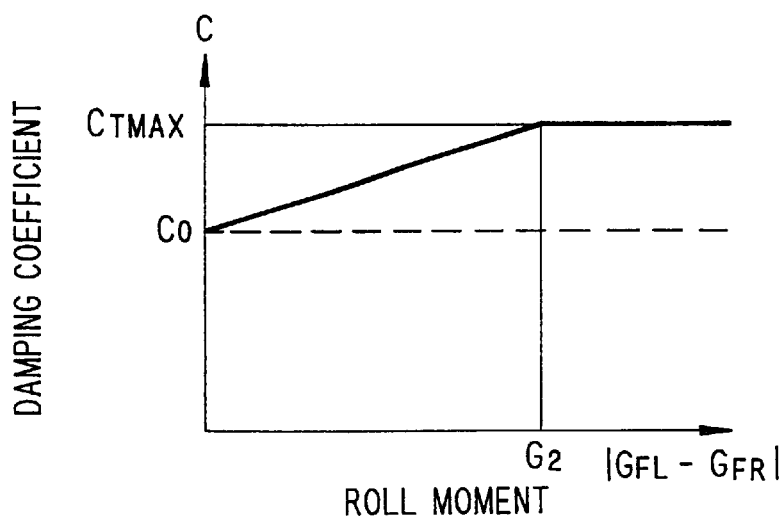
FIG. 7 is a map which specifies a relation between the roll moment and damping coefficient in a turning steady state with which the control unit is provided.

In the step S220, the damping coefficient C is set according to a sequential steering state map in FIG. 7, and the routine proceeds to a step S223.

Figure 8:
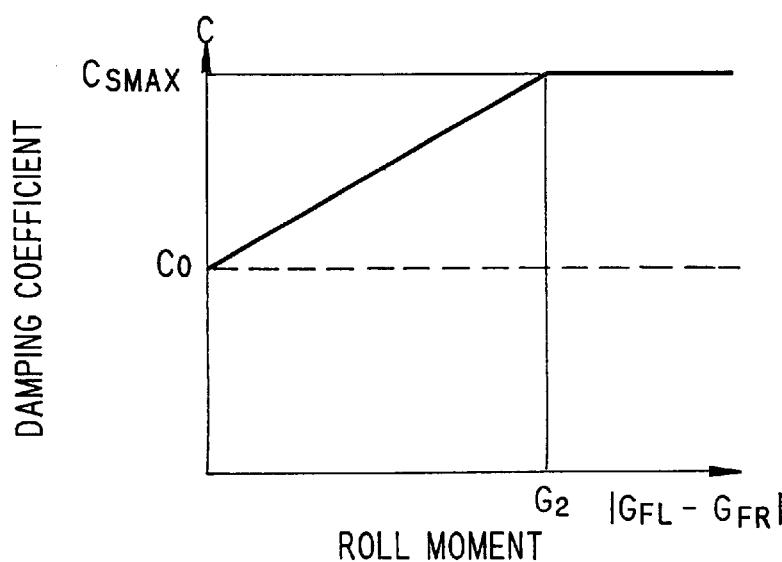
FIG. 8 is a map which specifies the relation between the roll moment and damping coefficient in a sequential steering state with which the control unit is provided.

In the step S221, the damping coefficient C is set according to a turning steady state map in FIG. 8, and the routine proceeds to the step S223.

In the step S222, the damping coefficient C is set to a preset damping coefficient $C_0$ for straight advance, and the routine proceeds to the step S223.

In the step S223, the left and right front wheel roll attenuation control variables $F_{VRFL}$, $F_{VRFR}$ are obtained by multiplying the roll speed $V_R$ by the attenuation coefficient C, and the routine proceeds to a step S224. In this embodiment, left and right rear wheel roll attenuation control variables $F_{VRRL}$, $F_{VRRR}$ are both set to "0".

In the step S224, the value θ'(n−1) on the immediately preceding occasion is updated to the value θ'(n) of the steering angular velocity on the present occasion, the value θ'(n−2) two occasions earlier is updated to the value θ'(n−1) on the immediately preceding occasion, and the routine proceeds to the step S3 in FIG. 4.

Next, control maps used in the steps S219 to S221 of the computing process of FIG. 5 will be described referring to FIGS. 6–8.

FIG. 6 is a damping coefficient set map for the turn transient state.

The damping coefficient C varies according to the absolute value of the difference between the vertical accelerations $G_{FL}$, $G_{FR}$ of the left and right front wheels, i.e. according to the magnitude of the roll moment which acts on the front of the vehicle body 10. Strictly speaking, the difference between the vertical accelerations $G_{FL}$, $G_{FR}$ is a couple component of the roll input which acts on the front of the vehicle body, and it is equal to the roll angular acceleration if divided by half of the front wheel tread.

When the roll moment $|G_{FL}-G_{FR}|$ is less than a relatively small predetermined value $G_1$, the damping coefficient C is set to the constant $C_0$ for the straight advance state. When the roll moment $|G_{FL}-G_{FR}|$ coincides with the predetermined value $G_1$, the damping coefficient C is set to a minimum value $C_{VMIN}$ in the turn transient state. When the roll moment $|G_{FL}-G_{FR}|$ is equal to or greater than a relatively large predetermined value $G_2$, the damping coefficient C is set equal to a maximum value $C_{VMAX}$ ($<C_0$) in the turn transient state. When the roll moment $|G_{FL}-G_{FR}|$ lies between the predetermined values $G_1$, $G_2$, the damping coefficient C increases in proportion to the roll moment $|G_{FL}-G_{FR}|$.

FIG. 7 is a damping coefficient set map for the turning steady state.

Herein, the damping coefficient C increases proportionally from the damping coefficient $C_0$ for the straight advance state as the roll moment $|G_{FL}-G_{FR}|$ increases from "0". When the roll moment $|G_{FL}-G_{FR}|$ is equal to or greater than the predetermined value $G_2$, the damping coefficient C is set to the maximum value $C_{TMAX}$ ($>C_0$) in the turning steady state.

FIG. 8 is a damping coefficient set map for the sequential steering state.

Herein, the damping coefficient C increases proportionally from the predetermined value $C_0$ for the straight advance state as the roll moment $|G_{FL}-G_{FR}|$ increases from "0". The inclination is larger than the inclination of the damping coefficient in the turning steady state. When the roll moment $|G_{FL}-G_{FR}|$ is equal to or greater than the predetermined value $G_2$, the damping coefficient C is set to the maximum value $C_{SMAX}$ ($>C_0$) in the sequential steering state. $C_{SMAX}$ in the sequential steering state is larger than the maximum value $C_{TMAX}$ in the turning steady state.

Figures 9A, 9B:
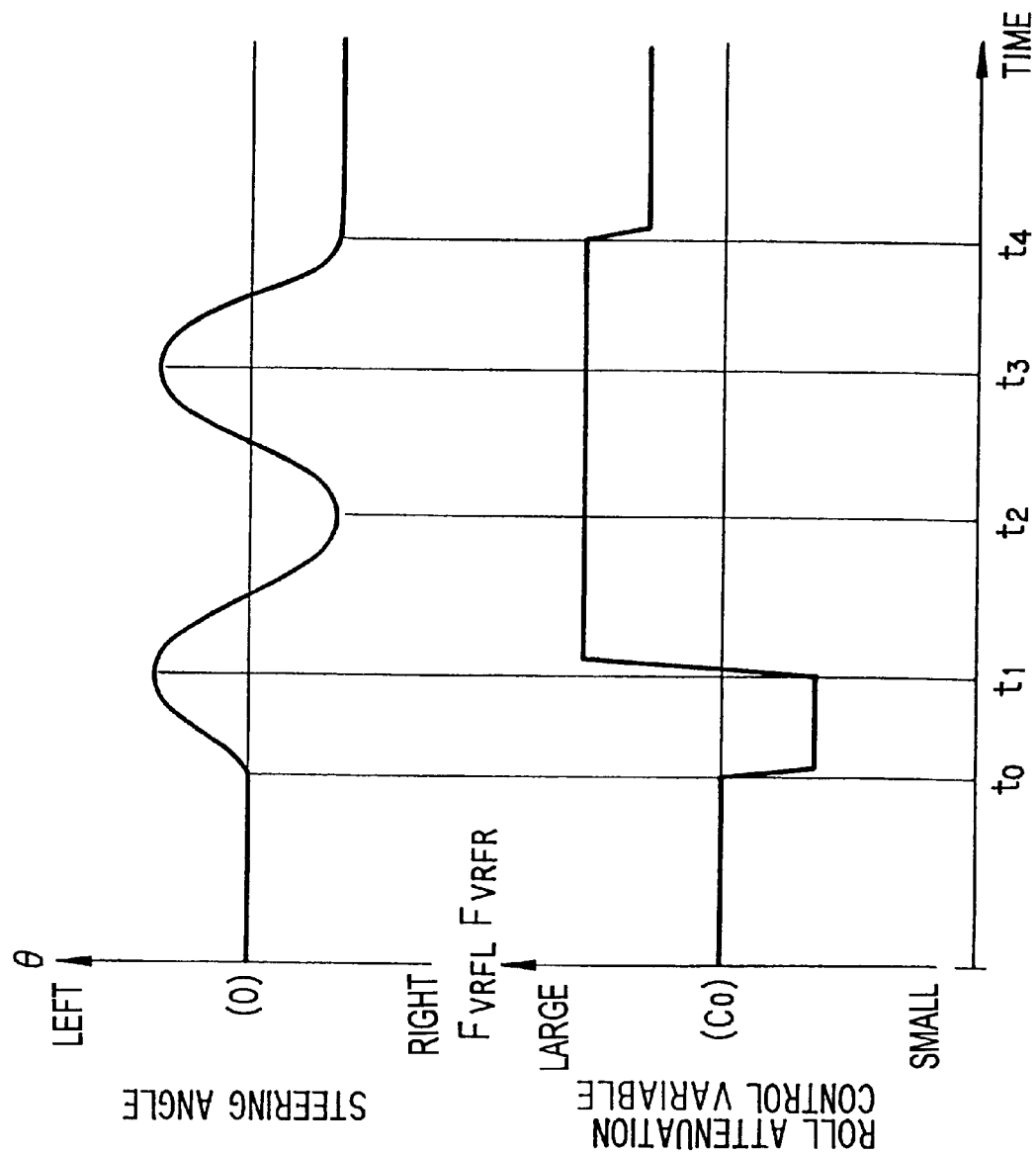
FIGS. 9A, 9B are timing charts showing how the steering angle and roll attenuation control variable vary in the sequential steering state.

The timing charts of FIGS. 9A, 9B show a variation of steering wheel angle and the roll attenuation control variable when the steering wheel is turned to the left at a time $t_0$, and the vehicle is then sequentially steered to the left and right as in slalom running.

The vehicle moves straight until the time to. At this time, as the steering angle θ of the steering wheel is "0", and the steering angular velocity θ' of the steering wheel is "0", the damping coefficient C is set to the damping coefficient $C_0$ for straight advance. As a result, the roll attenuation control variables $F_{VRFL}$, $F_{VRFR}$ are maintained at values corresponding to the damping coefficient $C_0$ for the straight advance state.

When the steering wheel is turned to the left at the time t0, the damping coefficient C is set to a smaller value than the damping coefficient $C_0$ for straight advance.

Therefore, subsequently, the roll attenuation control variables $F_{VRFL}$, $F_{VRFR}$ are set to smaller values than in the straight advance state until the steering wheel is next rotated in the opposite direction.

When the steering wheel is turned in the opposite direction at a time $t_1$, referring to the sequential steering state map of FIG. 8, the damping coefficient C is set to a larger value than the damping coefficient $C_0$ for straight advance. Therefore, the roll attenuation control variables $F_{VRFL}$, $F_{VRFR}$ are set to larger values than for straight advance.

At times $t_2$, $t_3$, the vehicle is steered sequentially to the left and right, the damping coefficient C continues to be set at a large value, and the roll attenuation control variables $F_{VRFL}$, $F_{VRFR}$ maintain large values.

From a time $t_4$, when the steering angle $\theta$ is maintained at a certain angle, the damping coefficient C is set to a slightly smaller value than for the sequential steering state by referring to the turning steady state map in FIG. 7, but a larger damping coefficient is set compared to the damping coefficient $C_0$ when going straight. Therefore, the roll attenuation control variables $F_{VRFL}$, $F_{VRFR}$ are subsequently larger than for straight advance, but are set to smaller values than for the sequential steering state.

In this way, when sequential steering to the left and right is performed, the damping force of the front wheels is increased and the roll rigidity is increased, so even if a roll moment is repeatedly input, roll of the front of the vehicle can be suitably attenuated. Also, as the vehicle has a tendency to understeer, the driver's attention is aroused.

Moreover, the damping force of the hydraulic cylinders 18FL~18RR can easily be adjusted by adjusting the damping coefficient against the roll speed input.

In the aforesaid embodiment, the steering angular velocity was detected by the steering angular velocity sensor 25 and the steering angle was detected by the steering angle sensor 26, however the steering angular velocity may be obtained by differentiating the steering angle and conversely, the steering angle may be obtained by integrating the steering angular velocity, so it is sufficient to detect either of these parameters and obtain the other one by computation.

Further, in the aforesaid embodiments, it was determined that the vehicle was in the turning transition state from the steering angular velocity, but this can be determined also from the change rate of the lateral acceleration or the appearance of the roll moment. The sequential steering operation to the left and right may also be detected by detecting the inversion of lateral acceleration or inversion of roll moment.

This embodiment was described in the case where a microcomputer was used as the control unit 30, but an electronic circuit such as a counter or comparator may be used instead.

The contents of Japanese Application No. 9-245459, with a filing date Sep. 10, 1997, are hereby incorporated by reference.

The embodiments of this invention in which an exclusive property or privilege is claimed are defined as follows:

What is claimed:

1. A roll rigidity control device comprising:
    an actuator installed between a vehicle front wheel and body for generating an attenuation force according to a command signal,
    a sensor for detecting a sequential steering operation to the left and right, and
    a microprocessor programmed to:
        output said command signal to said actuator so that, when said vehicle is in a turn transient state, the attenuation force of said actuator is smaller than the attenuation force when said vehicle is moving straight, and
        output said command signal to said actuator such that the attenuation force of said actuator is larger than the attenuation force when said vehicle is in the turn transient state, when said sequential steering operation is detected.

2. A roll rigidity control device as defined in claim 1, wherein said microprocessor is further programmed to:
    output command signal to said actuator such that the attenuation force of said actuator is larger than the attenuation force when said vehicle is moving straight, when said sequential steering operation is detected.

3. A roll rigidity control device as defined in claim 1, wherein said microprocessor is further programmed to:
    output said command signal to said actuator such that the attenuation force of said actuator is larger than the attenuation force when said vehicle is moving straight, when said vehicle is in a turning steady state, and
    output said command signal to said actuator such that the attenuation force of said actuator is still larger than the attenuation force when said vehicle is in the turning steady state, when said sequential steering operation is detected.

4. A roll rigidity control device as defined in claim 1, wherein said actuator is a hydraulic cylinder, and said microprocessor is programmed to vary the attenuation force of said hydraulic cylinder by varying the damping coefficient of said hydraulic cylinder.

* * * * *